May 9, 1944.  E. W. MILLER  2,348,354
GRINDING WHEEL DRESSER
Filed June 14, 1941   2 Sheets-Sheet 2
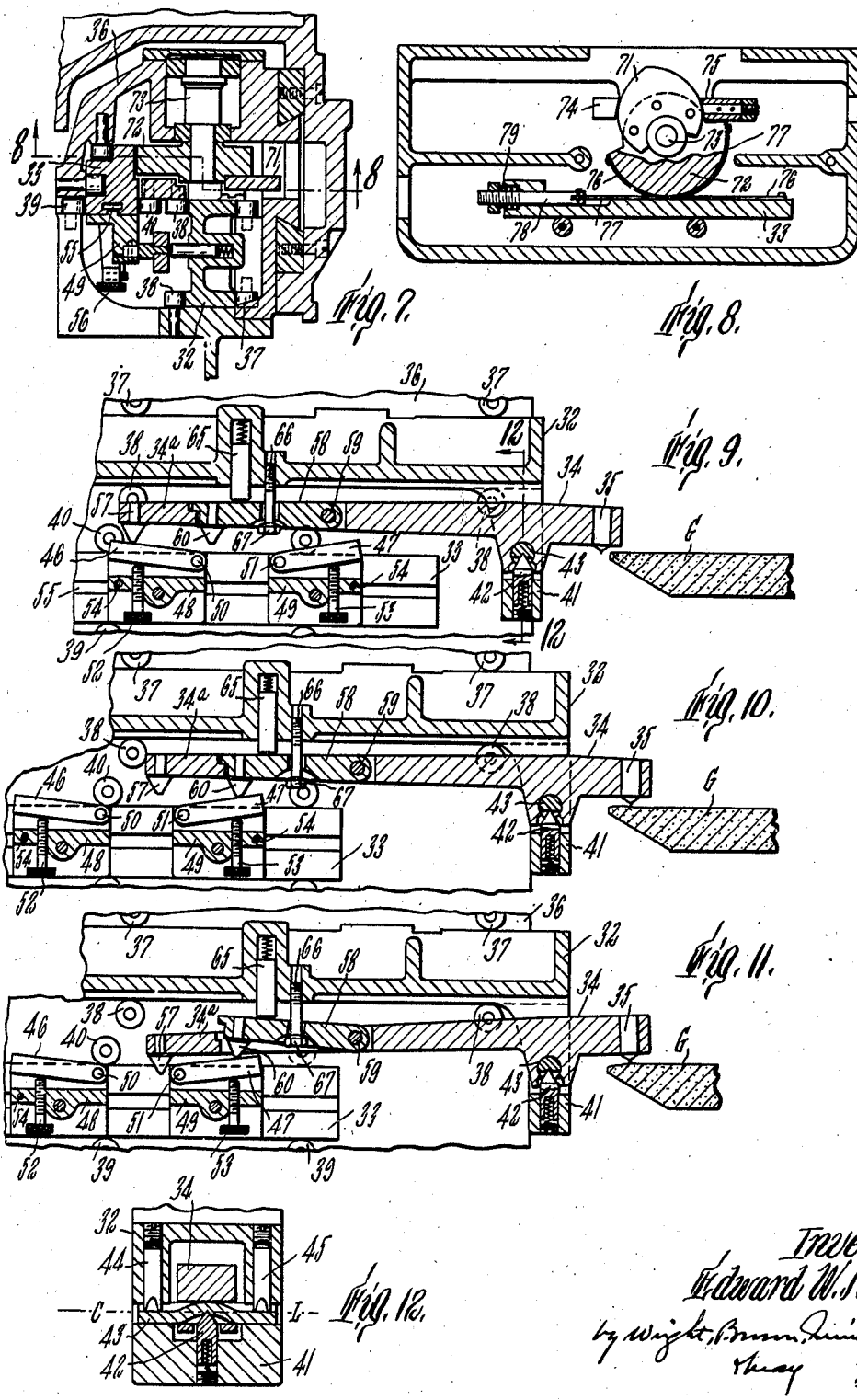

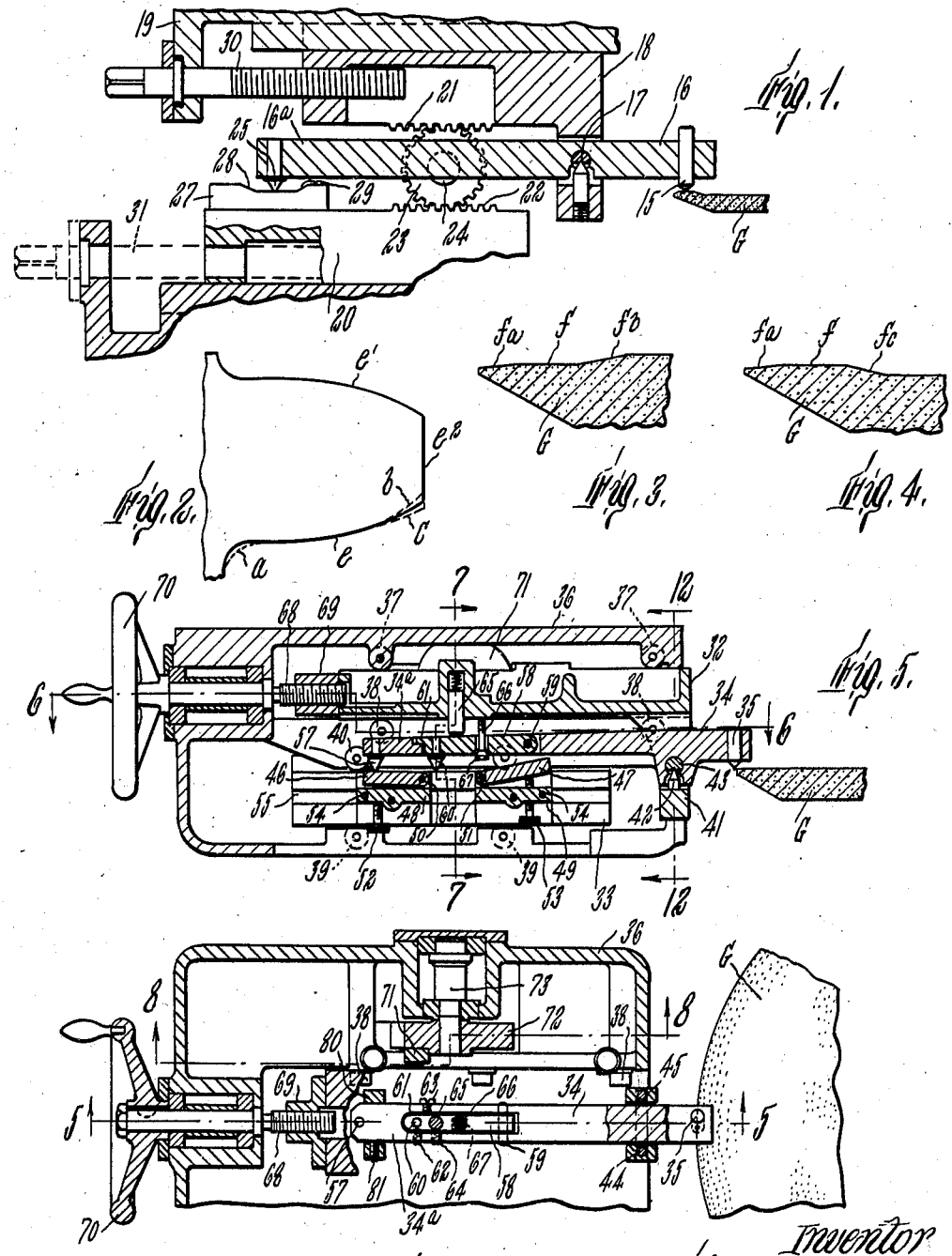

Patented May 9, 1944

2,348,354

UNITED STATES PATENT OFFICE 2,348,354

GRINDING WHEEL DRESSER

Edward W. Miller, Springfield, Vt., assignor to The Fellows Gear Shaper Company, Springfield, Vt., a corporation of Vermont Application June 14, 1941, Serial No. 398,101

9 Claims. (Cl. 125—11)

The invention herein is concerned with means for dressing the active or operating faces of grinding wheels to produce contours in such faces of which the elements are other than continuous straight lines. Its primary object is to control the movements of the dressing tool, in its departures from a continuous straight line, by displacement means having a greater range of movement than that ordained for the point of the dressing tool, to the end that the latter will follow a prescribed path most accurately, and within tolerances which are a fraction of the closest tolerances maintainable in the commercial manufacture of such displacement means.

Grinding wheels with plane, cylindrical, or conical active faces can be dressed and trued by a dressing tool moving in a continuous straight line across the active face. For some purposes, however, it is necessary to produce contours which depart from these simple forms; and to produce and maintain such contours, the truing tool must travel in a path which departs more or less widely, in one or another direction, from a continuous straight line in some part or parts of its extent. Such departure may be a straight line or a curved line, or a succession of different straight lines or curves, or of both straight lines and curves.

One particular type of wheel with respect to which such departures are needed is that used for generating the tooth faces of involute gears and gear shaper cutters with modifications from true involute curvature. Such wheels have a plane active face which, in consequence of an appropriate relative rolling movement, generates the required involute curve. In cases where a departure from the true involute curvature must be generated in the work piece, the wheel face is dressed with a conjugate departure from its plane. Other forms of wheel may require other kinds of modification.

A high degree of accuracy is obtainable in the straight line motion of a dressing tool carried by a slide accurately interfitted and adjusted with guiding members arranged in straight lines. It is important, and necessary for the production of satisfactorily accurate work, that the dressing tool be guided with equal precision and accuracy in its departures from continuous straight line motion. This result is accomplished by the present invention.

Another object which I have sought and obtained by this invention is to provide such a wheel dressing appliance as that hereinbefore outlined, with means whereby it may be adjusted to obtain different degrees of deviation of the dressing tool from a straight line. Still another object is to provide means whereby the dressing point may be displaced in different directions from a given line. Further objects subsidiary to the foregoing appear in connection with the subsequent description of the invention.

In this specification, and in the drawings which accompany it, I have illustrated the invention with reference to the specific use above mentioned, that is, to produce contours in a plane-faced grinding wheel adapted to generate modifications from involute curvature in parts of the tooth faces of a gear shaper cutter or an involute gear. It is to be understood that this illustration is not a limitation of the invention to that use only, but that the underlying principles are applicable to a wide variety of other purposes in other specific combinations and forms within the scope of the protection which I claim.

In the drawings—

Fig. 1 is a diagrammatic sectional view of a simple form of wheel dressing apparatus illustrating the principles of the invention;

Fig. 2 is an end view, on an enlarged scale, of one tooth of an involute gear shaper cutter, showing by dotted lines some of the modifications from involute curvature which are sometimes required with cutters of that type;

Figs. 3 and 4 are fragmentary radial sections of the marginal part of grinding wheels appropriately formed to generate the tooth modifications so illustrated;

Fig. 5 is a sectional view of a wheel dressing apparatus or device embodying all the features of the present invention and including adjusting means for various purposes. This section is taken on line 5—5 of Fig. 6 looking in the direction of the arrows applied to said line;

Fig. 6 is a sectional view of the same apparatus taken on line 6—6 of Fig. 5;

Fig. 7 is a cross section taken on line 7—7 of Fig. 5;

Fig. 8 is a section parallel to that of Fig. 5 taken on line 8—8 of Fig. 6;

Figs. 9, 10 and 11 are sectional views similar to Fig. 5 showing the adjustments and action of the dressing apparatus for effecting certain specified results;

Fig. 12 is a cross section taken on line 12—12 of Figs. 5 and 9.

Like reference characters designate the same parts wherever they occur in all the figures.

Reference is directed first to Figs. 2, 3 and 4 for explanation of the results obtained by the herein illustrated embodiment of the invention. Fig. 2 shows the cutting end of one tooth of a gear shaper cutter adapted to generate involute gears. The full lines $e$ and $e'$ represent the cutting edges at the opposite sides of the tooth, and $e^2$ represents the cutting edge at the tooth extremity or crest. The curves $e$ and $e'$ are involute curves generated to final finished accuracy by a relative rolling action between the cutter and a grinding wheel, such as the wheel G, of which a fragment is shown in these drawings. Modifications from true involute form are frequently provided in such cutters in order to remove additional stock from the teeth of the gears generated by the cutter, or to leave excess stock on some parts of the teeth so generated. For example, in Fig. 2 the dotted line at $a$ represents a modification made by providing additional width at the root of the tooth in order to cut away the gear teeth to less than standard width at their crests. The dotted line $b$ represents a modified curvature at the tip of the cutter tooth provided to leave excess stock at the roots of the conjugate gear teeth; and the line $c$ represents a modification made by leaving additional stock on the cutter tooth for the purpose of cutting away the roots of the generated gear teeth.

The involute curves $e$ and $e'$ are generated by the plane face $f$ of the grinding wheel. In order to produce the modified curve $a$, such face is formed by the dressing tool with a contour $fa$ adjacent to the circumference conjugate to the curve $a$. To produce the modified curve $b$, a conjugate contour $fb$ is produced on the grinding wheel face in a zone displaced from the circumference. To produce the modification $c$, a contour $fc$ (Fig. 4) is produced in a corresponding zone of the wheel. The elements of the plane face $f$ are straight lines in a plane radial to the axis of the wheel, while the elements of the contours $fa$, $fb$ and $fc$ are curved or inclined straight lines which deviate from the elements of the plane surface. For convenient distinction, contours such as $fb$, which protrude forwardly in the face of the wheel, may be called positive shapes, and those such as $fa$ and $fc$ which recede from the plane may be called negative shapes. The inclinations of these contours with respect to the plane face are of three different characters. They are formed by passing a dressing tool across the wheel face, in a straight line while traversing the plane portion of such face, and with a deviation from such straight line when traversing a positive or negative shape.

The basic concept of the present invention is the control of the dressing point by means of cooperating elements having an extent of relative movement greater than that of the dressing point (in other words, a magnification of the dressing point movement), in consequence of which such unavoidable errors as may exist in the control means are divided and decreased in the movement of the dressing point. A simple, elementary embodiment of this concept is shown in Fig. 1. Here the dressing tool 15, which may be, as usual, a shank or bar carrying a diamond in its extremity, is mounted to protrude from one arm of a lever 16 pivoted at 17 to a slide 18, which is mounted to travel in accurately constructed guideways in a frame 19. A second slide 20 is likewise mounted to move in guideways on the frame. Preferably such guideways are parallel to each other and perpendicular to the pivot axis of lever 16. Racks 21 and 22 are carried by the respective slides and mesh with a gear 23 rotatably supported by a fixed pivot 24 mounted in the stationary frame.

The lever 16 has a second arm 16a, which carries a cam follower 25, and slide 20 carries a cam 27 having oppositely sloping faces 28 and 29 and a level surface between them. The arms of the lever are of unequal lengths, and the cam follower is at a substantially greater distance from the pivot axis than is the point of the dressing tool. For instance, in this illustration, the ratio is nearly three to one.

The slide 18 and lever 16 are moved endwise when the wheel is being dressed, and they may be so moved by any suitable means such as the screw 30 engaged with a nut on the slide and reacting against a thrust bearing on the frame, or vice versa. When slide 18 is so moved in either direction, slide 20 is moved in the opposite direction through the action of the racks 21, 22 and gear 23. The components of motion due to this travel of the slides and to the cam faces 28 and 29, cause the dressing tool to form a contour such as that shown at $fa$ when the follower 25 travels over cam surface 28; and a contour such as $fc$ when the follower travels over cam face 29.

The coordinates of the sloping cam surfaces are longer than the coordinates of the inclined paths of the dressing point, due to the simultaneous movements of the two slides in opposition to one another and to the unequal lever arms. Hence however close to absolute accuracy the tolerance limits of the cam faces may be, those of the dressing tool path are still closer. In other words, whatever errors may exist in the cams are greatly reduced at the dressing point. In the further interests of accuracy, the lever is mounted by frictionless bearings of the knife edge type, which may be essentially the same as those shown in Fig. 12 and later described; and the cam follower 25 is so made as to have an area of contact with the cam commensurate with the extent of the active edge of the dressing tool. It may be conical or of chisel form, with a more or less blunt or rounded point or edge. Generically the cam and cam follower constitute relatively movable displacement elements, of which the cam is the displacer and the follower is the displaced member, cooperatively organized to cause deviation of the moving dressing tool from a continuous straight line at a prescribed point, or points, in its path; the slides 18 and 20 constitute carriers, or carriages, for the cam follower and cam respectively; slide 18 being also a carrier for the lever 16 and the dressing tool. Lever 16 is both a holder for the dressing tool and a means for transmitting diminished motion from the cam to the dressing tool.

The force for relatively moving said slides may be applied to the slide 20 instead of slide 18, or to both simultaneously. A screw 31 is shown by broken lines as engaged with the frame and slide 20 in the same manner that the screw 30 is engaged with slide 18. When screw 31 is used, screw 30 may be removed, or its thrust bearing may be disconnected, or both screws may be operated simultaneously.

A further embodiment of the invention containing adjusting means and refinements additional to those above described is shown in Figs. 5–12 inclusive. It may be assumed that the wheel shown in these figures is mounted with its active face in a vertical plane and that the dressing apparatus is located so that the dressing point travels along the horizontal diameter of the wheel. On this assumption then, Figs. 5 and 8 are horizontal sections as viewed from below, Fig. 6 is a vertical section viewed toward the face of the wheel in a direction parallel to the axis thereof, and Fig. 7 is a vertical section as seen looking toward the wheel axis. But of course the attachment may be mounted in any position around the axis of a grinding wheel, whether the wheel face is vertical, horizontal or inclined; and it also may be cooperatively arranged with respect to a cylindrical or conical wheel face.

In the embodiment now being described, slides 32 and 33 correspond to the slides 18 and 20 previously described, and lever 34 carrying a dressing tool 35 corresponds to lever 16. These slides are guided for rectilinear movement in parallel paths within a frame or housing 36; slide 32 being so guided by sets of rollers 37 and 38, at opposite sides, the slide 33 by corresponding sets of rollers 39 and 40. Lever 34 passes through a yoke 41 which forms part of slide 32, and is secured pivotally therein by knife edge bearings consisting of a spring pressed cone pointed plunger 42 engaging the mid length point of a bar 43, and two chisel edged pins 44 and 45 engaging the opposite side of bar 43 near the opposite ends thereof. The bar 43 is fitted tightly in the lever and is recessed at opposite sides to furnish bearing points and lines for the extremities of the said plunger and pins, all the bearing points being in the same straight line C—L, which is the pivot axis of the lever.

Two cam elements 46 and 47, which correspond to the cam surfaces 28 and 29 first described, are mounted on slide 33 by means of adjustable cam-holding blocks 48 and 49, respectively, to which the cams are connected by pivots 50 and 51. These cams may be adjusted to various inclinations by adjusting screws 52 and 53 in threaded connection with the blocks. Also the cams may be clamped in their adjusted positions, each block being split in continuation of the slot in which the cam is contained, and the partially severed wall of the slot being clamped against the cam by a clamp screw 54. The blocks in turn are adjustable lengthwise of slide 33, having bolts, the heads of which occupy an undercut slot 55 in the side of the slide, and the shanks of which pass through the blocks and carry clamp nuts 56 on their outer ends. The slides are further provided with guide ribs fitting the outer portion of slot 55.

Lever 34 carries near the extremity of its long arm 34a a cam follower 57 arranged to bear on the cam 46. The same lever arm likewise carries an auxiliary or secondary lever 58 pivoted at 59 and carrying a cam follower 60 arranged to cooperate with cam 47. The auxiliary lever 58 is located in an opening which passes entirely through the lever arm 34a, and the axis of its pivot 59 is parallel to the pivot axis of the main lever. It is formed with a lip 61 on its extremity overlapping and engaging a ledge on the main lever when in line with the latter, and may be locked in that position by a set screw 62 which has a conical point entering a recess in the side of the auxiliary lever. Also provided are an abutment screw 63 and a clamp screw 64 mounted in opposite sides of the main lever to engage the sides of the auxiliary lever and clamp the latter in various positions of adjustment. When both the locking screw and the clamp screw are released, lever 58 may swing freely about its pivot.

A spring pressed pin 65 is mounted in the slide 32 and arranged to press on auxiliary lever 58 at the side thereof opposite to that where the cams 46 and 47 are located, at a point between pivot 59 and cam follower 60 and in the direction to hold the follower 57 against cam 46, and follower 60 against cam 47, when the followers traverse these cams, respectively. An abutment screw 66 is secured to the slide and passes through an enlarged opening in the auxiliary lever 58, having a head 67 with a spherical surface which is adapted to bear against a complemental seat at the side of the lever opposite to that against which the spring 65 presses and, when neither cam follower engages its controlling cam, to serve as a stop limiting movement of arm 34a toward carriage 33. The abutment screw is located between the pivot 59 and the line of thrust of pin 65, and its head 67 serves also as a fulcrum about which the auxiliary lever may turn, when the locking and clamp screws are released, so as to apply force to the main lever through the pivot 59. The purpose and function of the mechanism last described are explained later on.

Slide 32 is moved in the path defined by the guides 37 and 38 by means of a screw 68 in mesh with a nut 69 on the slide; the shaft of the screw having a rotative and thrust-supporting bearing in the frame and being rotated by any suitable means, automatic or manual, such as the hand wheel 70. At the same time the cam-bearing slide 33 is moved oppositely to the slide 32 by means generically equivalent to the racks and intermediate pinion described in connection with Fig. 1, but modified to obtain a different speed ratio. This modified transmission mechanism consists of a cam or former 71 and a cylindrical segment 72 secured to a shaft 73, which latter is mounted in bearings in the frame or housing with its axis transverse to the paths of the two slides. The former is embraced by two abutments, 74 and 75, on the slide 32, and corresponds to a gear tooth, the abutments being in effect conjugate rack teeth. The segment 72 is coupled with slide 33 by tapes 76 and 77 in a well known manner; one tape being secured rigidly to the slide and the other being made fast to a plunger 78 with which a spring 79 cooperates to maintain a constant tension in both tapes. This latter connection is another equivalent of rack and pinion gearing. The former 71 cooperates with the abutment 74 on a pitch circle of shorter radius than that of the segment 72, the ratio of which in this illustration, is one to three, whereby the relative motion between the cams and cam followers is four times the movement of the dressing tool over the wheel face. Any other desired ratio may be obtained by selection of an appropriate former and conjugate abutments.

It will be evident from the foregoing description that the cam 46 and follower 57 are adapted to control the dressing tool while traversing a contour such as that designated fa; the device as a whole being suitably located with respect to the wheel being trued, and the cam 46 and block 48 being appropriately adjusted. Angular adjustment of cam 46 determines the extent of deviation of the dressing point from the plane of the wheel face; and adjustment of the block enables such deviation to coincide with a wider or narrower zone adjacent to the rim of the wheel. The operation under control of cam 46 is illustrated in Fig. 9.

With the auxiliary lever 58 locked to the main lever, the cam 47 and follower 60 cooperate to develop a contour in the wheel such as that shown at fc, which has been defined as a negative shape, the deviation of which from the plane of the wheel is determined by angular adjustment of the cam, and the location on the wheel face by adjustment of block 49. This cooperation is shown in Fig. 10. Continuous passage of the slides from the relative position shown in Fig. 9 to that shown in Fig. 10 causes the dressing point to form a negative shape at the margin of the wheel, a plane surface adjacent thereto, and a negative shape inward from the plane zone. It may be noted here that the abutment screw 66 is located to limit the movement of the lever arm 34a toward the cams and hold the dressing point in a given path when both followers are in the space between the two cams.

To form a positive shape, such as jb, the screws confining the secondary lever 58 are released. Then when the follower 60 traverses cam 47, the action and reaction between the cam, the spring pressed pin 65, and the abutment screw head 67 cause the dressing tool to be deflected in the opposite direction to that caused when the secondary lever is locked to the main lever; as is shown by Fig. 11. Either cam may be employed without the other in case a modification is required in only one zone of the wheel.

It goes without saying that the cam surfaces may be either straight or curved with any curvature which will give the required contours of the wheel face; of course within the limitations of propelling and controlling mechanisms of the general character here shown.

In order to relieve the pivot bearings of the lever 34 of lateral stresses, the arm 34a of said lever is confined between guides 80 and 81, either or both of which may be adjustable.

The generic terms applied to the parts of the apparatus shown in Fig. 1 apply equally to the corresponding parts of the embodiment shown in Figs. 5-12. Equivalents of the parts and combinations shown in these embodiments may be adapted for similar use with wheels of other types than that here shown, and they are embraced for all like and analogous uses within the scope of the protection herein claimed. The lever is the simplest, most accurate and most efficient means for transmitting diminished motion from the cam follower to the dressing tool, but other means operable to the same effect are included within the scope of the invention.

What I claim and desire to secure by Letters Patent is:

1. A wheel dressing apparatus comprising two carriages mounted to travel in prescribed paths, a lever pivoted to one carriage on an axis so located that its arms are enabled to swing in paths transverse to the path of said carriage, a cam mounted on the other carriage, a dressing tool mounted on one arm of said lever, a secondary lever pivoted to the first lever on an axis substantially parallel to the axis of the first lever and at a distance therefrom greater than the distance of the dressing tool from the axis of the first lever, a cam follower carried by said secondary lever in position to be engaged and shifted by said cam, a yielding presser acting on said secondary lever in a direction to press the cam follower against the cam, an abutment reacting on the secondary lever in a direction opposite to the action of the yielding presser, but in a line at one side thereof, both the yielding presser and abutment being located between the cam follower and the pivot of the secondary lever, and means for relatively moving said carriages.

2. A wheel dressing device comprising a supporting structure, two carriages mounted on said structure for movement in prescribed paths both extending in substantially the same directions, a dressing tool, a holder to which said dressing tool is secured mounted movably on one of said carriages in a manner to shift the dressing tool in a path transverse to the path of that carriage, a plurality of cams having extended contact faces mounted on the other carriage in tandem arrangement along the path of movement thereof with provision for angular adjustment to place their contact faces at different inclinations to said paths, cam follower means associated with the dressing tool holder in locations such that they are enabled to engage said cams successively in consequence of relative movement between the holders, means for adjusting each of said cams angularly to vary the extent of movement imparted thereby to said cam follower means in the course of a given extent of relative movement between the carriages, and means for effecting relative movement between the carriages such as to cause actuating engagement of the cams successively with said cam follower means.

3. A wheel dressing device comprising a supporting structure, two carriages mounted on said structure for movement in prescribed paths both extending in substantially the same directions, a dressing tool, a holder to which said dressing tool is secured mounted movably on one of said carriages in a manner to shift the dressing tool in a path transverse to the path of that carriage, a plurality of cams having extended contact faces mounted on the other carriage in tandem arrangement along the path of movement thereof with provisions for angular adjustment to place their contact faces at different inclinations to said paths, cams follower means associated with the dressing tool holder in locations such that they are enabled to engage said cams successively in consequence of relative movement between the holders, means for adjusting each of said cams angularly to vary the extent of movement imparted thereby to said cam follower means in the course of a given extent of relative movement between the carriages, and provisions for adjusting said cams on their carriage lengthwise of the path of the carriage, whereby to vary the locations, in the path of movement of the dressing tool at which they are engaged by said follower means.

4. A wheel dressing device comprising a supporting structure, two carriages mounted on said structure for movement in substantially parallel paths, means for moving said carriages simultaneously in their respective paths in relatively opposite directions, a plurality of cams mounted on one of said carriages in tandem along the path of movement thereof, a lever mounted on the other carriage to swing about a pivot axis transverse to the path of that carriage, a dressing tool mounted on one arm of said lever, cam follower means mounted on the other arm of said lever arranged to engage the said cams successively when the carriages are moved in the manner set forth, and means for adjusting the cams angularly to various inclinations with the path of movement whereby to vary the extent of movement which they impart to the said follower means.

5. A wheel dressing apparatus comprising a supporting structure, two carriages mounted on said structure for movement in prescribed paths, a lever having arms of unequal length pivoted on one of said carriages so that its arms may swing in paths transverse to the path of the carriage, a dressing tool mounted on the shorter lever arm, a cam follower on the longer lever arm, a secondary lever pivoted to said longer arm, a cam follower on said secondary lever, a resiliently actuated presser arranged to exert force on the secondary lever at a point between the pivot thereof and the cam follower thereon, a fulcrum abutment engaging the secondary lever at the side thereof opposite to that on which said presser acts located between the presser and pivot, cam means on the other carriage arranged to act on said cam followers successively in consequence of relative movement of the carriages, and means for moving the carriages simultaneously in their respective paths with relative movement between them.

6. A wheel dressing apparatus comprising a carriage guided to move in a given path and including a yoke frame embracing an open space, a lever extending through said space having a knife edge pivotal connection with the yoke consisting of a V ended pin engaging the lever at one point and two other V ended pins engaging the lever at separated points at respectively opposite sides of the first named point, all of said points being in substantially the same straight line transverse to the length of the lever, the first named pin being at one side of said line and the two other pins being at the opposite side of said line, the lever having arms extending to opposite sides of said line, a dressing tool mounted on one of said arms, a cam follower carried by the other arm, a second carriage, means for moving said carriages simultaneously in substantially parallel paths with relative movement between them, and a cam mounted on the second carriage in position to engage and cause displacement of said cam follower when relative movement between the carriages takes place.

7. A wheel dressing apparatus comprising a supporting structure, two carriages mounted on said structure for movement in different paths, both extending in substantially the same direction, a lever pivotally mounted on one of said carriages having arms extending from its pivotal connection in directions substantially parallel to the path of said carriage, the mounting for said lever consisting of abutments of knife edge character engaging the lever at three separated points substantially in a straight line transverse to the length of the lever, one of said abutments being between and at the opposite side of said line from the other two, and the mutual reaction between the lever and abutments being in directions substantially perpendicular both to the said line and to the length of the lever, a dressing tool carried by one of said lever arms, a cam follower element on the other lever arm, a cam carried by the other of said carriages in position to engage said cam follower element and disposed to cause movement of the lever about its pivotal axis when relative movement occurs between the carriages, and means for moving the carriages in their respective paths and at the same time altering the positions of the carriages with respect to each other.

8. A wheel dressing apparatus comprising a supporting structure, two carriages mounted and guided to move on said structure in related paths, a cam device mounted on one of said carriages, a cam follower, a dressing tool and motion transmitting means between said follower and tool mounted on the other carriage with the cam follower in position to be engaged and displaced by said cam when the carriages are moved relatively to one another, and motion transmitting means between the carriages consisting of a former and a segment in rigid connection with each other mounted rotatably on said supporting structure, two abutments on one carriage embracing said former and tapes secured to said segment and passing around the circumference thereof in relatively opposite directions to connection at separated points with the other carriage.

9. A wheel dressing apparatus comprising a supporting structure, two carriages mounted and guided to move on said structure in related paths, a cam device mounted on one of said carriages, a cam follower, a dressing tool and motion transmitting means between said follower and tool mounted on the other carriage with the cam follower in position to be engaged and displaced by said cam when the carriages are moved relatively on one another, and motion transmitting means between the carriages consisting of a former and a segment in rigid connection with each other mounted rotatably on said supporting structure, two abutments on one carriage embracing said former and tapes secured to said segment and passing around the circumference thereof in relatively opposite directions to connection at separated points with the other carriage, the connection between the tape and carriage at one of said points including a spring arranged to exert force between the carriage and tape in a manner to maintain both tapes under tension.

EDWARD W. MILLER.